United States Patent
Bookwala (10) Patent No.: US 11,446,805 B2
(45) Date of Patent: Sep. 20, 2022

(54) HYDRAULIC HAMMER

(71) Applicant: DEERE & COMPANY, Moline, IL (US)

(72) Inventor: Hatim Bookwala, Pune (IN)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 17/098,517

(22) Filed: Nov. 16, 2020

(65) Prior Publication Data
US 2021/0060751 A1 Mar. 4, 2021

Related U.S. Application Data (62) Division of application No. 16/127,743, filed on Sep. 11, 2018, now Pat. No. 10,875,167.

(30) Foreign Application Priority Data

Nov. 20, 2017 (IN) .............................. 201721041450

(51) Int. Cl.
*B25D 9/14* (2006.01)
*E02F 3/96* (2006.01)
(Continued)

(52) U.S. Cl.
CPC ................ *B25D 9/14* (2013.01); *E02F 3/966* (2013.01); *E02F 9/265* (2013.01); *G01C 9/06* (2013.01);
(Continued)

(58) Field of Classification Search
CPC ........ B25D 2250/101; B25D 2250/221; B25D 9/14; E02F 3/966; E02F 9/265; G01C 2009/066; G01C 9/06
See application file for complete search history.

(56) References Cited

U.S. PATENT DOCUMENTS

| 6,170,317 B1 * | 1/2001 | Juuri | B28D 1/26 |
| | | | 73/11.03 |
| 6,330,503 B1 * | 12/2001 | Sharp | B05B 12/124 |
| | | | 701/50 |

(Continued)

FOREIGN PATENT DOCUMENTS

| CN | 101932774 A | 12/2010 |
| CN | 105735400 A | 7/2016 |

(Continued)

OTHER PUBLICATIONS

Chinese Office Action issued in application No. 201811221078.0 dated Nov. 30, 2021 (15 pages).

(Continued)

*Primary Examiner* — Andrew M Tecco
*Assistant Examiner* — Nicholas E Igbokwe (57) ABSTRACT

A hydraulic hammer for a working machine configured for digging a surface includes a housing, a chisel, sensors, and a controller. The housing is coupled to the working machine. The chisel is partially enclosed by the housing and extendable from the housing for digging the surface at a contact location. Each of the sensors is configured for generating a signal indicative of a projecting distance between one of the sensors and the surface. The controller is configured for receiving the signals, determining an angle between the chisel and a plane substantially tangent to the contact location, and reorienting the chisel so that the chisel is substantially orthogonal to the contact location with the angle at substantially ninety degrees.

15 Claims, 7 Drawing Sheets

(51) Int. Cl.
*E02F 9/26* (2006.01)
*G01C 9/06* (2006.01)

(52) U.S. Cl.
CPC .. *B25D 2250/101* (2013.01); *B25D 2250/221* (2013.01); *G01C 2009/066* (2013.01)

(56) References Cited

U.S. PATENT DOCUMENTS

| | | | | |
|---|---|---|---|---|
| 6,510,902 | B1* | 1/2003 | Prokop | E02F 3/966 |
| | | | | 173/1 |
| 7,200,516 | B1* | 4/2007 | Cowley | B23B 49/00 |
| | | | | 356/138 |
| 2009/0198382 | A1* | 8/2009 | Koch | E02F 3/432 |
| | | | | 700/275 |
| 2012/0145426 | A1 | 6/2012 | Nickels et al. | |
| 2012/0250815 | A1* | 10/2012 | Oksman | E02F 9/267 |
| | | | | 377/16 |
| 2015/0354950 | A1* | 12/2015 | Nihei | B21J 15/142 |
| | | | | 702/167 |
| 2015/0360361 | A1* | 12/2015 | Gunasekaran | E02F 5/305 |
| | | | | 173/90 |
| 2016/0184982 | A1* | 6/2016 | Dostinov | E02F 3/966 |
| | | | | 173/90 |
| 2017/0120478 | A1 | 5/2017 | Ellis et al. | |
| 2017/0274515 | A1* | 9/2017 | Frank | E02F 9/265 |

FOREIGN PATENT DOCUMENTS

| | | |
|---|---|---|
| CN | 106988369 A | 7/2017 |
| CN | 107052909 A | 8/2017 |
| EP | 0128763 A2 | 12/1984 |

OTHER PUBLICATIONS

Chinese Office Action issued in application No. 201811221078.0 dated Jun. 7, 2022 (13 pages).

* cited by examiner

HYDRAULIC HAMMER

RELATED APPLICATIONS

This is a divisional application of U.S. application Ser. No. 16/127,743, titled Hydraulic Hammer, filed Sep. 11, 2018 which claims the benefit of India application No. 201721041450, titled Hydraulic Hammer, filed Nov. 20, 2017, all which are hereby incorporated by reference in their entirety.

FIELD OF THE DISCLOSURE

The present disclosure relates generally to a breaking device applied on a working machine in construction.

BACKGROUND OF THE DISCLOSURE

A hydraulic hammer (e.g., hydraulic breaker or rock breaker) is a widely used tool in construction. In particular, it can be utilized in clearing obstructions on a road or on walls or crush material on a surface for later processing. A hydraulic hammer may have a chisel reciprocating from a housing to dig a surface. The hydraulic hammer may not be only applied to an excavator, but also to a backhoe loader, skid steer loader, or other working machine.

In order to obtain the best results from a hydraulic hammer, the chisel must be operated at an optimal angle with respect to the surface. Departing from this angle may cause damage to the hydraulic hammer, such as bending the chisel or abrading a housing of the hydraulic hammer. Therefore, it is necessary to develop a technique to reorient the hydraulic hammer such that it is able to perform at the optimal angle.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a method to adjust a hydraulic hammer of a working machine digging at a contact location of a surface at optimal degrees may include providing a housing of the hydraulic hammer having a bottom surface including an aperture; providing a chisel partially enclosed by the housing and extendable from the aperture for digging the surface; providing a first sensor and a second sensor positioned on the bottom surface of the housing; generating a first signal indicative of a first projecting distance between the first sensor and the surface; generating a second signal indicative of a second projecting distance between the second sensor and the surface; receiving the first signal and the second signal; determining an angle between the chisel and a plane tangent to the contact location of the surface based on the first signal and the second signal; and reorienting the chisel, if the angle is not at the optimal degrees, until the angle is at the optimal degrees.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

The disclosure relates to a working machine, such as an excavator, with a hydraulic hammer (hydraulic breaker, rock breaker). Although the description of the hydraulic hammer is directed to the excavator, the description is equally applicable to a backhoe loader, a skid steer loader, or other working machine.

The disclosure provides a solution to reorient a chisel of the hydraulic hammer so that the hydraulic hammer can be operated at an optimal angle between the chisel and a surface which the hydraulic hammer is digging. The optimal angle, in general, is substantially ninety degrees. The solution can be utilized in conditions not only when the chisel of hydraulic hammer is digging a horizontal surface with the working machine positioned on the horizontal ground, but also when the working machine is positioned on tilted ground and/or when the chisel is digging a tilted contact location of a surface.

Figure 1:
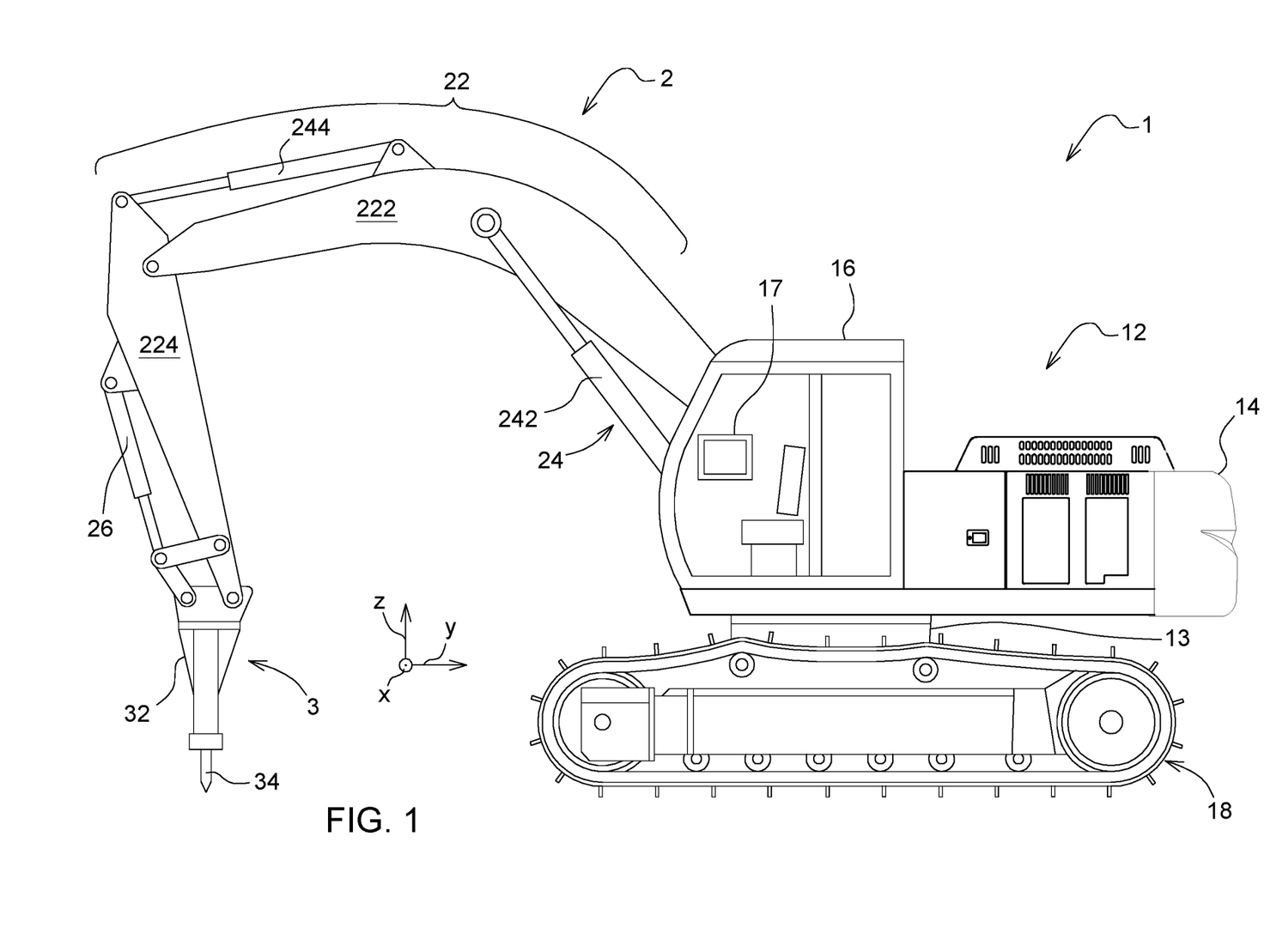
FIG. 1 is a side view of an excavator with a hydraulic hammer.
Figure 2:
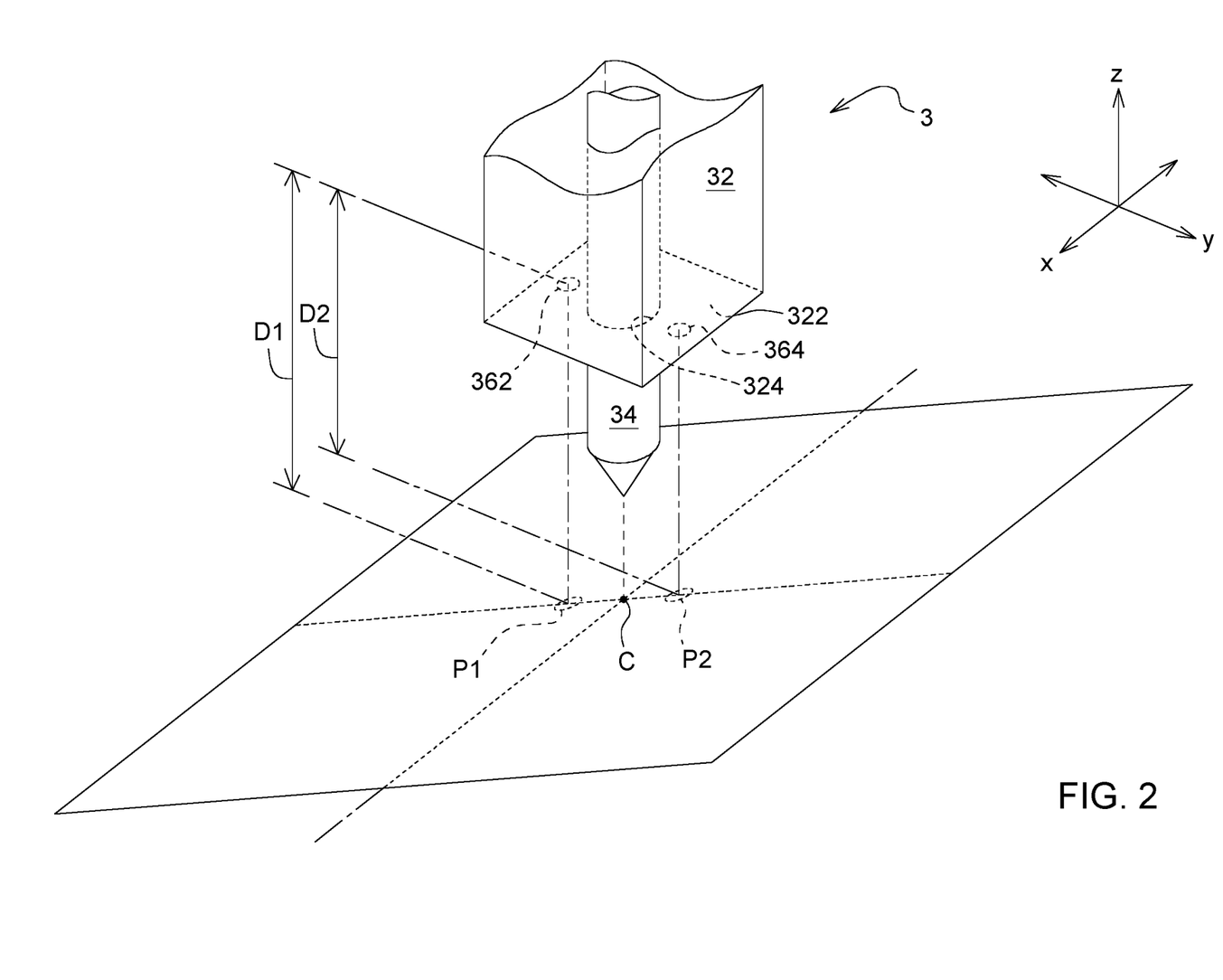
FIG. 2 is an enlarged view of one embodiment of a hydraulic hammer with two sensors.
Figure 7:
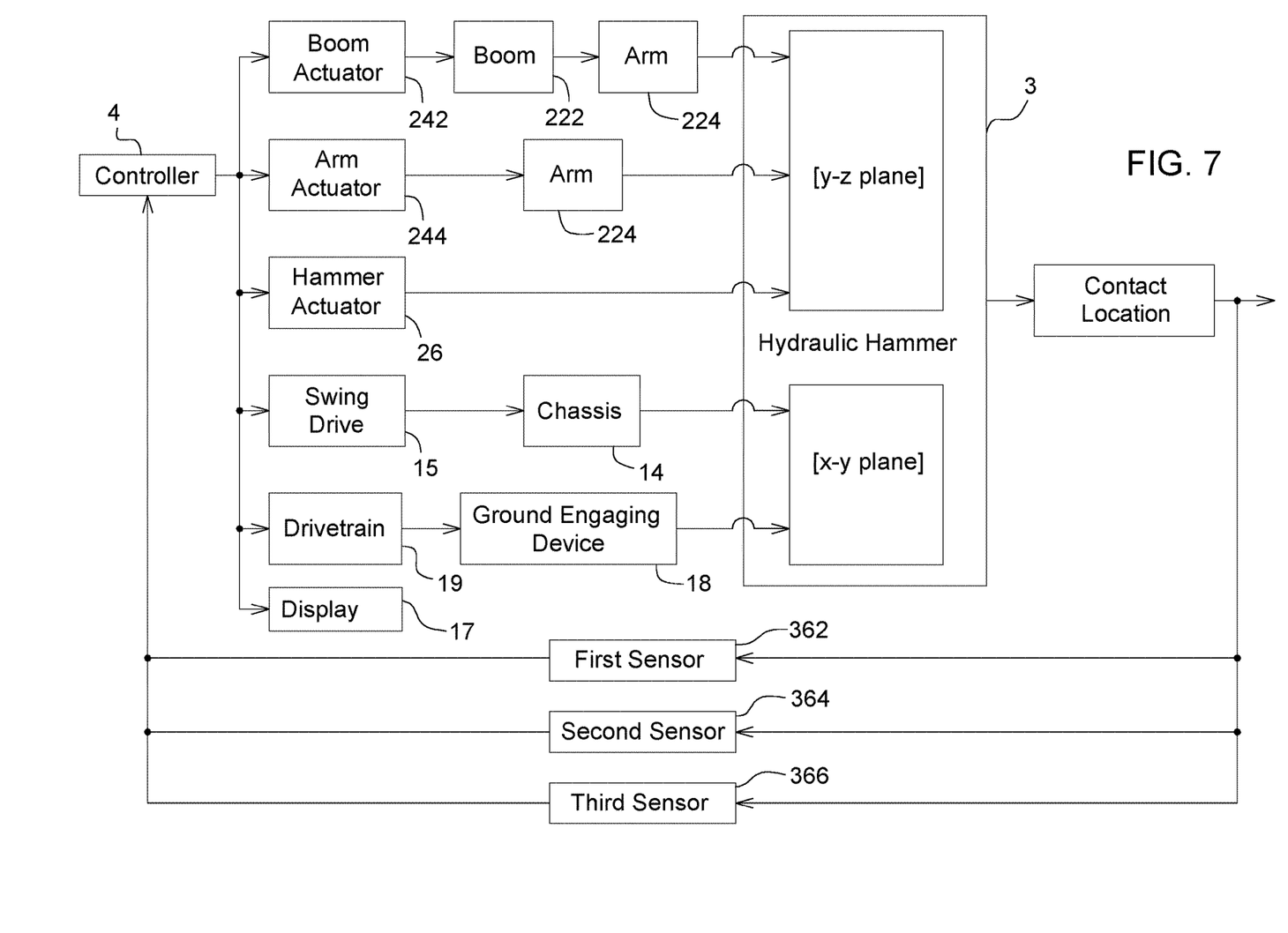
FIG. 7 is a block diagram illustrating the embodiment of FIG. 5.

Referring to FIGS. 1 and 7, the depicted working machine 1 is an excavator. The working machine 1 comprises a main frame 12, a moving system 2, a hydraulic hammer 3, and a controller 4. The main frame 12 includes a chassis 14 accommodating an engine, transmission, cooling system (not shown), and a cabin 16. In this embodiment, the working machine 1 includes a ground engagement device 18 positioned below the main frame 12 and driven by a drivetrain (not shown). The ground engagement device 18 is a pair of track assemblies but it can also be other kinds of ground engagement devices such as wheels. The working machine 1 also includes a swing bearing 13 positioned between the main frame 12 (chassis 14) and the ground engagement device 18. The swing bearing 13 is coupled to the main frame 12 and to the ground engagement device 18 and configured to allow a swing of the main frame 12 relative to the ground engagement device 18 along an X-Y plane. The swing of the main frame 12 is driven by a swing drive 15 (FIG. 7) of the working machine 1.

The moving system 2 of the working machine 1 includes an implement 22 coupled to the main frame 12, and an implement actuator 24 driving the implement 22 to pivotally move along the Y-Z plane. The hydraulic hammer 3 is coupled to the implement 22 and is driven by a hammer actuator 26 to pivotally move along the Y-Z plane. In this embodiment, the implement 22 of the working machine 1 includes a boom 222 having one end coupled to the main frame 12, and an arm 224 having one end coupled to the other end of the boom 222. The hydraulic hammer 3 is coupled to the other end of the arm 224. The boom 222 is driven by a boom actuator 242, the arm 224 is driven by an arm actuator 244, and hydraulic hammer 3 is moved by a hammer actuator 26 to pivotally move along the Y-Z plane. Alternatively, different working machines 1 may have implements 22 and implement actuators 24 designed in a different fashion, such as merely including one piece of the boom 222 or arm 224, one end of which coupled to the main frame 12 and the other end of which is directly coupled to the hydraulic hammer 3 and moved by the boom actuator 242 or the arm actuator 244.

Figure 3:
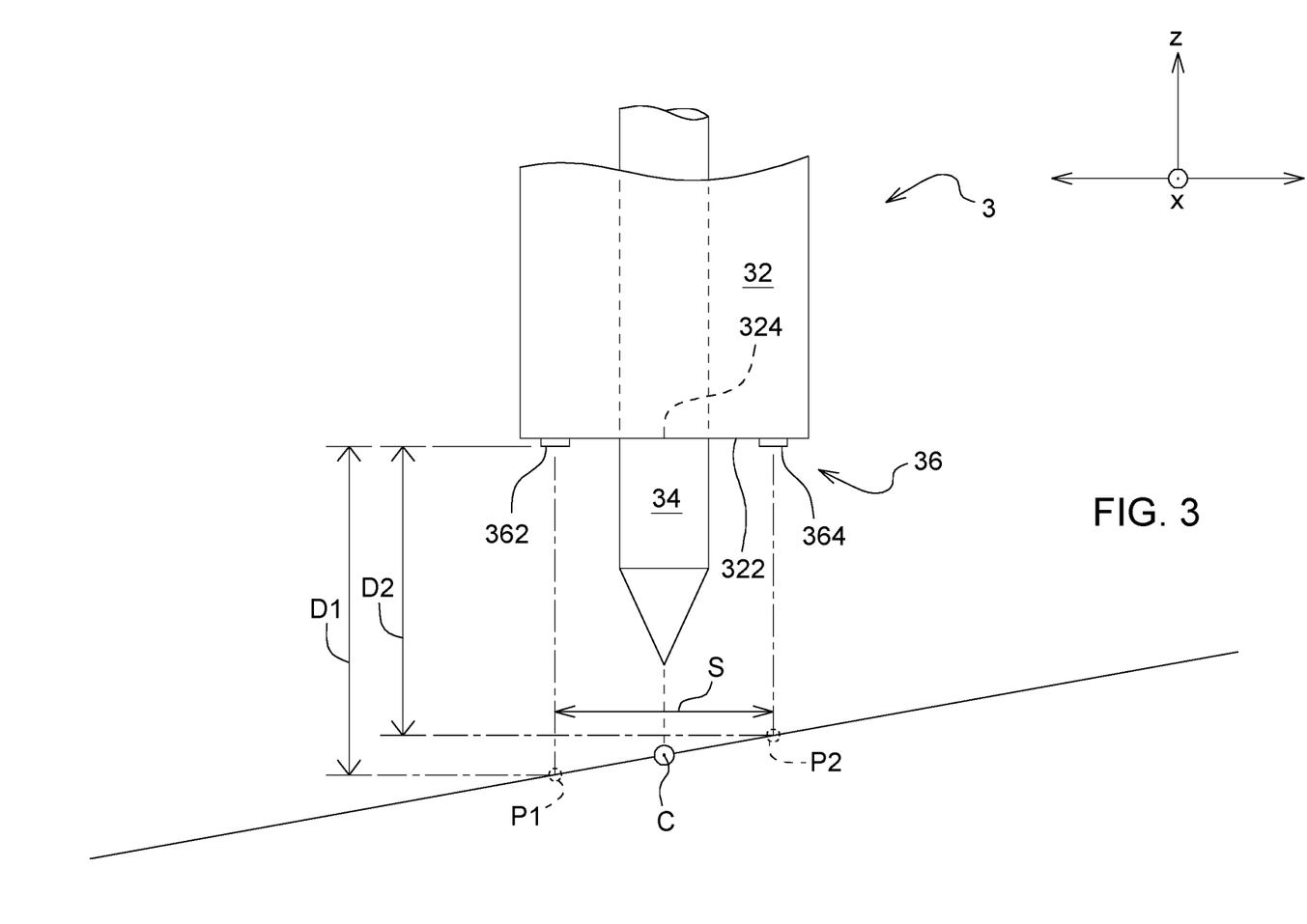
FIG. 3 is a side view of the embodiment of FIG. 2.

Referring to FIGS. 1-4, this embodiment provides a solution for when the surface is not horizontal and tilted about the X axis. The hydraulic hammer 3 is coupled to the hammer actuator 3 via a linkage. The hydraulic hammer 3 comprises a housing 32 coupled to the arm 224, a chisel 34, and a plurality of sensors 36 (FIG. 3). The housing 32 comprises a bottom surface 322 comprising an aperture 324 through which the chisel 34 is positioned. The chisel 34 is partially enclosed by the housing 32 and extendable from the housing 32 for digging the surface at a contact location C. The plurality of sensors 36, in the embodiment of FIG. 2-4, includes a first sensor 362 and a second sensor 364 positioned on the bottom surface 322 of the housing 32. The first sensor 362, the second sensor 364, and the aperture 324 are substantially collinear. The first sensor 362 is configured for generating a first signal indicative of a first projecting distance D1 between the first sensor 362 and the surface. The second sensor 364 is configured for generating a second signal indicative of a second projecting distance D2 between the second sensor 364 and the surface. A first projection P1 is projected on the surface from the first sensor 362 along the first projecting distance D1; a second projection P2 is projected on the surface from the second sensor 364 along the second projecting distance D2.

Figure 4:
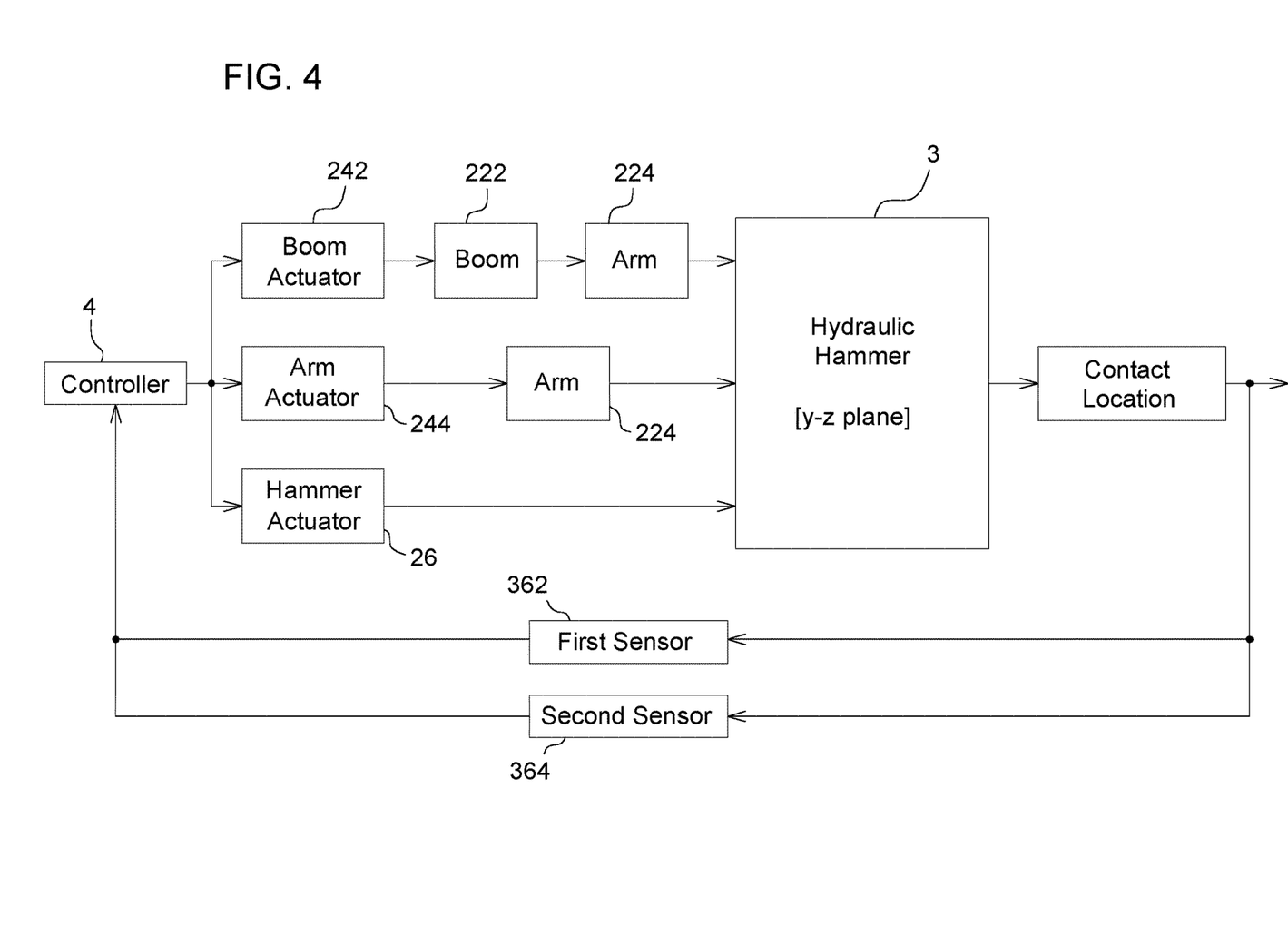
FIG. 4 is a block diagram illustrating the embodiment of FIG. 2.

Referring to FIGS. 3 and 4, because of the surface tilted about X axis, it is feasible to determine the angle between the chisel 34 and the surface, in particular, the angle between the chisel 34 and a plane substantially tangent to the contact location C. The data of the positions of the first sensor 362 and the second sensor 364 is stored in a memory (not shown) in communication with the controller 4. In FIG. 3 a data related to an interval S between the first sensor 362 and the second sensor 364 on the bottom surface 322 may also be stored in the memory or calculated by the controller 4 based upon the positions of the first sensor 362 and the second sensor 364. Because the interval S may be a limited amount, the first projection P1 and the second projection P2 are substantially at the plane that is substantially tangent to the contact location C. The controller 4 is also configured for receiving the first signal indicative of the first projecting distance D1 and the second signal indicative of the second projecting distance D2. The angle therefore can be determined via the controller 4 by ninety degrees minus arctangent of a difference between the first projecting distance D1 and the second projecting distance D2 divided by an interval S between a first sensor 362 and the second sensor 364.

Referring to FIG. 4, since the angle is determined, if the angle is not at the optimal degrees, the chisel 34 of the hydraulic hammer 3 will be reorienting until the chisel 34 is substantially orthogonal to the contact location C by this closed loop system. In order to reorient the chisel 34, the controller 4 transmits at least one signal to at least one of the boom actuator 242, arm actuator 244, and hammer actuator 26 that may be pivotally moved along the Y-Z plane. It is possible that controller 4 transmits control signals to boom actuator 242, arm actuator 244, and hammer actuator 26 to coordinate the boom 222, arm 224, and hydraulic hammer 3 to perform the precise alignment.

This embodiment demonstrates a closed loop system. The angle between the chisel 34 and the plane changed by at least one of boom actuator 242, arm actuator 244, and hammer actuator 26 will continue being detected by the first sensor 362 and the second sensor 364 and then new signals indicative of first projecting distance D1 and second projecting distance D2 will be received by the controller 4. Then the controller 4 will transmit new control signal(s) to at least one of the boom actuator 242, arm actuator 244, and hammer actuator 26 for new alignment.

Figure 5:
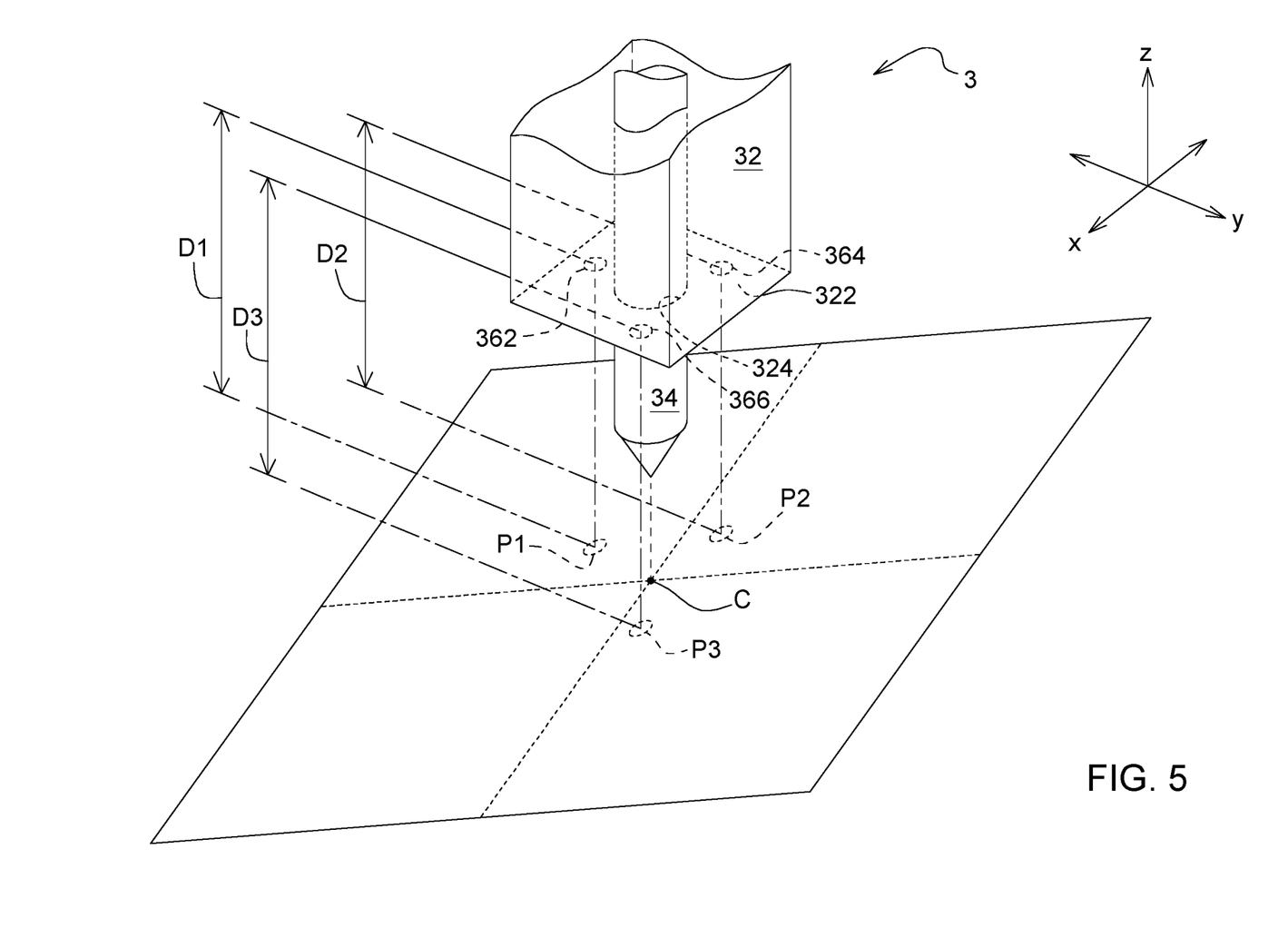
FIG. 5 is an enlarged view of another embodiment of a hydraulic hammer with three sensors.
Figure 6:
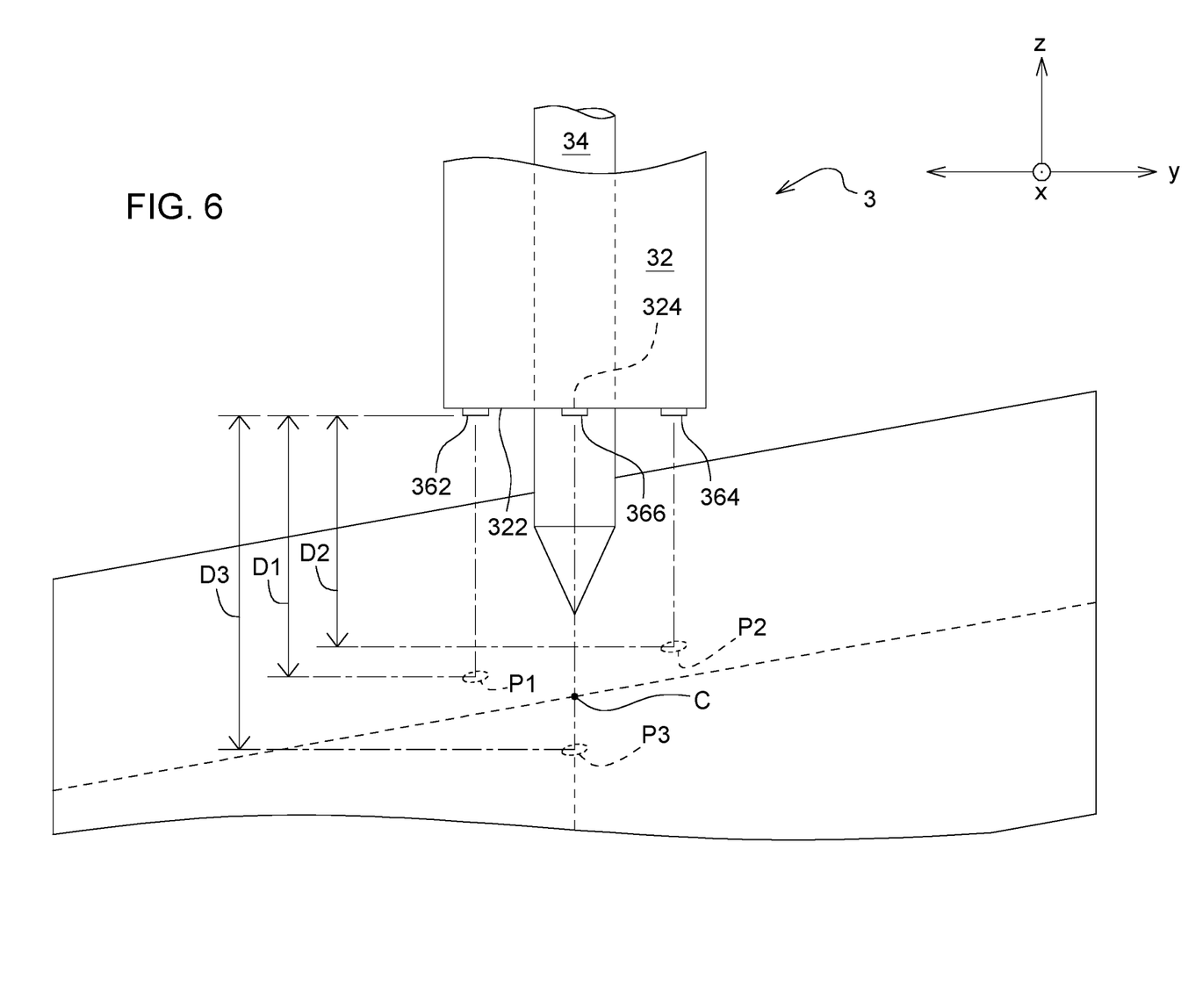
FIG. 6 is a side view of the embodiment of FIG. 5.

Referring to FIGS. 5-7, another embodiment is disclosed. The surface may not only be tilted about X axis but may also be tiled about the Y and/or Z axis as well and therefore this embodiment provides a solution to detect the angle between the chisel 34 and the surface tilted in various orientations. The plurality of sensors 36, includes a first sensor 362, a second sensor 364, and a third sensor 366 positioned on the bottom surface 322 of the housing 32. The first sensor 362, the second sensor 364, and the third sensor 366 surrounds the aperture 324 through which the chisel 34 positioned. The first sensor 362 is configured for generating a first signal indicative of a first projecting distance D1 between the first sensor 362 and the surface. The second sensor 364 is configured for generating a second signal indicative of a second projecting distance D2 between the second sensor 364 and the surface. The third sensor 366 is configured for generating a third signal indicative of a third projecting distance D3 between the third sensor 366 and the surface. A first projection P1 is projected on the surface from the first sensor 362 along the first projecting distance D1; a second projection P2 is projected on the surface from the second sensor 364 along the second projecting distance D2; and a third projection P3 is projected on the surface from the third sensor 366 along the third projecting distance D3. Because the intervals between the first sensor 362, the second sensor 364, and the third sensor 366 are limited, the first projection P1, the second projection P2, and the third projection P3 are substantially at the plane that is substantially tangent to the contact location C. Therefore, the plane tangent to the contact location C is at least determined by the first projection P1, the second projection P2, and the third projection P3.

A controller 4 in this embodiment may calculate a normal vector perpendicular to the plane and examine whether the normal vector is parallel to the chisel 34 to further examine whether the chisel 34 is substantially perpendicular/orthogonal to the contact location C with the angle is at substantially ninety degrees. If not, the controller 4 transmits at least one control signal to adjust the angle by reorienting the chisel 34 facing toward the contact location C of the surface and being parallel to the normal vector. To perform such alignment, the controller 4 transmits at least one control signal to at least one of the drivetrain 19, the at least one implement actuator 24, swing drive 15, and the hammer actuator 26 to respectively move at least one of the ground engagement device 18, implement 22, main frame 12 (chassis 14), and hydraulic hammer 3. As shown in previous embodiment, the boom actuator 242 and the arm actuator 244 of the implement actuator 24 may directly or indirectly cause the hydraulic hammer 3 to move along Y-Z plane. This embodiment further includes controlling at least one of the swing drive 15 and drivetrain 19 (may be associate with steering device, not shown). The controller 4 may optionally transmit a control signal to the swing drive 15 to swing the main frame 12 (chassis 14) to adjust the angle from the perspective of X-Y plane. The controller 4 may also optionally transmit a control signal to the drivetrain 19 to move the working vehicle 1 to adjust the angle from the perspective of X-Y plane. It is noted that swinging the main frame 12 and/or moving the working machine 1 may also incur a change in Z dimension, for example, when the working machine 1 is operated on a hill. It is possible for the controller 4 to transmit multiple control signals to multiple actuators and/or drives to perform the alignment of the hydraulic hammer 3.

The reorientation of the chisel 34 may be operated automatically, namely, once the controller 4 receives the data from the sensors 36 and determines the angle is not optimal, the controller 4 will keep performing the reorientation and the sensors 36 will keep providing feedback to the controller 4, until the angle is at the optimal angle. However, such reorientation may be partially manual. The controller 4 may have electrical connection with a display 17 in the cabin 16. Before the controller 4 transmits control signals, the controller 4 transmits at least one notice signal to the display 19, showing the operator of the working machine 1 the future position of one of the implement 22, hydraulic hammer and/or degrees that the main frame 12 is going to rotate or swing, and/or the direction/route the working machine 1 is going toward to get the approval from the operator. In this regard, when the reorientation is performed, it is feasible to eliminate some potential hazards. For example, the implement 22 will not automatically come close to an object positioned near the working machine 1 while the main frame 12 is swinging and/or while the implement 22 is moving because the operator may deny an undesirable route.

The plurality of sensors 36 are not required to be positioned on the bottom surface 322 of the housing 32. Once the positions of the plurality of sensors 36 are stored in a memory for the controller 4 to retrieve, it is feasible for the controller 4 to receive the position data of the plurality of sensors 36 and projecting distances to calculate the plane substantially tangent to the contact location C.

The disclosure also provides methods to adjust a hydraulic hammer of a working machine 1 digging on a contact location of a surface at an optimal angle. An embodiment with at least two sensors is disclosed as follows:

Step 1: providing a first sensor and a second sensor positioned on the hydraulic hammer and being surrounding a chisel of the hydraulic hammer. Optionally, the first sensor, the second sensor, and an aperture through which the chisel is positioned are at the same surface. Optionally, the first sensor, the second sensor, and the aperture are substantially collinear.

Step 2: generating signals indicative of projecting distances received by a controller. In this embodiment, the first sensor and the second sensor are configured for generating a first signal indicative of a first projecting distance and a second signal indicative of a second projecting distance.

Step 3: determining an angle between the chisel and a plane tangent to a contact location of the surface at which chisel operates by the controller. The angle is partially determined by ninety degrees minus arctangent of a difference between the first projecting distance and the second projecting distance divided by an interval between the first sensor and the second sensor.

Step 4: reorienting the chisel, if the angle is not at the optimal degrees (e.g. ninety degrees), until the angle is at the optimal degrees. This step includes reorienting the chisel facing toward the contact location and being parallel to a normal vector penetrated through the plane. The controller transmits at least one control signal to at least one of a drivetrain, an implement actuator, a swing drive, and a hammer actuator to respectively move at least one of a ground engagement tool, a main frame, an implement, and the hydraulic hammer. It is noted that, optionally, before the controller transmits the at least one control signal, it generates at least one notice signal indicative of future position the implement, the hydraulic hammer and/or degrees of the main frame going to rotate or swing, and/or the direction/route the working machine 1 is going toward (or the future position of the working machine) to get the approval from the operator.

Another embodiment with at least three sensors is disclosed as follows:

Step 1: providing a first sensor, a second sensor, and a third sensor positioned on the hydraulic hammer and being surrounding a chisel of the hydraulic hammer. Optionally, the first sensor, the second sensor, the third sensor, and an aperture through which the chisel is positioned are at a surface.

Step 2: generating signals indicative of projecting distances received by a controller. In this embodiment, the first sensor, the second sensor, and the third sensor are configured for respectively generating a first signal indicative of a first projecting distance, a second signal indicative of a second projecting distance, and a third signal indicative of a third projecting distance.

Step 3: projecting a first projection on the surface from the first sensor along the first projection distance; projecting a second projection on the surface from the second sensor along the second projection distance; projecting a third projection on the surface from the third sensor along the third projection distance.

Step 4: determining an angle between the chisel and a plane tangent to a contact location of the surface at which chisel operates by the controller. The plane is determined by substantially passing through the first projection, the second projection, and the third projection.

Step 5: reorienting the chisel, if the angle is not at the optimal degrees (e.g. ninety degrees), until the angle is at the optimal degrees. This step includes reorienting the chisel facing toward the contact location and being parallel to a normal vector penetrated through the plane. The controller transmits at least one control signal to at least one of a drivetrain, an implement actuator, a swing drive, and a hammer actuator to respectively move at least one of a ground engagement tool, a main frame, an implement, and the hydraulic hammer. It is noted that, optionally, before the controller transmits the at least one control signal, it generates at least one notice signal indicative of future position the implement, the hydraulic hammer and/or degrees of the main frame going to rotate or swing, and/or the direction/route the working machine is going toward (or the future position of the working machine) to get the approval from the operator.

It is noted that the controller may include multiple control units respectively controlling the movement and/or of working machine, movement of implement(s), and the hydraulic hammer.

Without in any way limiting the scope, interpretation, or application of the claims appearing below, a technical effect of one or more of the example embodiments disclosed herein is to align the hydraulic hammer, directly or indirectly such that the chisel can be operated at the optimal angel between the chisel and the surface, to utilize appropriate compact and to avoid damage. Another technical effect of one or more of the example embodiments disclosed herein is that the disclosure is able to use not only on a horizontal surface but also a tilted surface.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method to adjust an orientation of a hydraulic hammer of a working machine digging at a contact location of a surface, comprising:
    providing a housing of the hydraulic hammer having a bottom surface including an aperture;
    providing a chisel partially enclosed by the housing and extendable from the aperture for digging the surface;
    providing a first sensor and a second sensor positioned on the bottom surface of the housing;
    generating a first signal indicative of a first projecting distance between the first sensor and the surface by the first sensor;
    generating a second signal indicative of a second projecting distance between the second sensor and the surface by the second sensor;
    receiving the first signal and the second signal;
    determining an angle between the chisel and a plane tangent to the contact location of the surface based on the first signal and the second signal; and
    reorienting the chisel, if the angle between the chisel and the plane tangent to the contact location of the surface is not at ninety degrees, until the chisel is orthogonal to the contact location with the angle at ninety degrees.

2. The method of claim 1, wherein the first sensor, the second sensor, and the aperture are collinear.

3. The method of claim 2, wherein the angle is determined by ninety degrees minus arctangent of a difference between the first projecting distance and the second projecting distance divided by an interval between the first sensor and the second sensor.

4. The method of claim 3, further comprising:
    storing a position data of the first sensor and a position data of the second sensor in a memory; and
    calculating the interval based on the position data of the first sensor and the position data of the second sensor.

5. The method of claim 3, further comprising:
    storing a data of the interval in a memory.

6. The method of claim 1, further comprising:
    providing a third sensor; and
    generating a third signal indicative of a third projecting distance by the third sensor.

7. The method of claim 6, further comprising:
    projecting a first projection on the surface from the first sensor along the first projecting distance;
    projecting a second projection on the surface from the second sensor along the second projecting distance;
    projecting a third projection on the surface from the third sensor along the third projecting distance;
    determining the plane passing through the first projection, the second projection, and the third projection.

8. The method of claim 1, further comprising:
    reorienting the chisel facing toward the contact location and being parallel to a normal vector penetrated through the plane.

9. The method of claim 1, wherein reorienting the chisel comprises transmitting the at least one control signal to at least one of a drivetrain, an implement actuator, a swing drive, and a hammer actuator to respectively move at least one of a ground engagement tool, a main frame, an implement, and the hydraulic hammer.

10. The method of claim 9, further comprising generating a notice signal indicative of degrees of the main frame going to swing to a display after determining the angle and before transmitting the at least one control signal to the swing drive.

11. The method of claim 9, further comprising generating a notice signal indicative of a future position of the implement to a display after determining the angle and before transmitting the at least one control signal.

12. The method of claim 9, further comprising generating a notice signal indicative of a future position of the hydraulic hammer to a display after determining the angle and before transmitting the at least one control signal.

13. The method of claim 9, further comprising generating a notice signal indicative of a direction of the working machine moving toward to a display after determining the angle and before transmitting the at least one control signal.

14. The method of claim 9, further comprising generating a notice signal indicative of a future position of the working machine to a display after determining the angle and before transmitting the at least one control signal.

15. The method of claim 9, further comprising generating a notice signal indicative of a result related to a movement of at least one of the ground engagement tool, the main frame, the implement, and the hydraulic hammer to a display after determining the angle and before transmitting the at least one control signal.

* * * * *